United States Patent
Congdon

(10) Patent No.: US 7,370,346 B2
(45) Date of Patent: May 6, 2008

(54) METHOD AND APPARATUS FOR ACCESS SECURITY SERVICES

(75) Inventor: Paul T. Congdon, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 790 days.

(21) Appl. No.: 10/425,436

(22) Filed: Apr. 29, 2003

(65) Prior Publication Data

US 2004/0250117 A1  Dec. 9, 2004

(51) Int. Cl.
G06F 7/04 (2006.01)
G06F 7/58 (2006.01)
G06F 15/16 (2006.01)
G06F 17/30 (2006.01)
G06F 9/00 (2006.01)
G06K 19/00 (2006.01)
H04L 9/32 (2006.01)

(52) U.S. Cl. .............................. 726/4; 726/12; 726/15

(58) Field of Classification Search .................... 726/3, 726/4, 12, 15; 709/225, 229; 370/218
See application file for complete search history.

(56) References Cited

U.S. PATENT DOCUMENTS

| | | | |
|---|---|---|---|
| 6,035,405 A | 3/2000 | Gage et al. | |
| 6,070,187 A | 5/2000 | Subramaniam et al. | |
| 6,181,699 B1 | 1/2001 | Crinion et al. | |
| 6,414,958 B1 | 7/2002 | Specht | |
| 6,515,993 B1 | 2/2003 | Williams et al. | |
| 6,526,052 B1 | 2/2003 | Rijhsinghani et al. | |
| 6,694,369 B1* | 2/2004 | Vepa et al. | 709/228 |
| 7,028,204 B2* | 4/2006 | Jammes et al. | 713/400 |
| 2002/0009078 A1* | 1/2002 | Wilson et al. | 370/389 |
| 2004/0103310 A1* | 5/2004 | Sobel et al. | 713/201 |

OTHER PUBLICATIONS

HP Procurve series 4100gl switches, Access Security Guide, Dec. 2002, Hewlett-Packard Company, pp. 6-19-6-31.*
Release Notes: Version G.04.05 Operating System for the HP Procurve Switch 4108GL, Feb. 2002, Hewlett-Packard Compnay, pp. 84-87.*
Hirofumi Kakiuchi, Illegal Access Prevention Technology by Authentication Virtual LAN, Apr. 2003, NEC Soft., pp. 192-196.*
ProCurve Networking by HP News—Press Release, May 8, 2001, printed Feb. 15, 2007, pp. 1-2.*

* cited by examiner

*Primary Examiner*—Benjamin E. Lanier

(57) ABSTRACT

One embodiment disclosed relates to a method for a switch to respond to a new client. A new client is detected at a port of the switch. The switch temporarily assigns the port to be an untagged member of a virtual local area network (VLAN) which is configured for unauthorized clients. Initialization services are provided to the new client via the unauthorized-client VLAN. The new client may be authenticated by way of an authentication session using the unauthorized-client VLAN. If the new client is authenticated, then the untagged membership of the port in the unauthorized-client VLAN is dropped, and the port is assigned to be an untagged member of a specified VLAN.

10 Claims, 6 Drawing Sheets

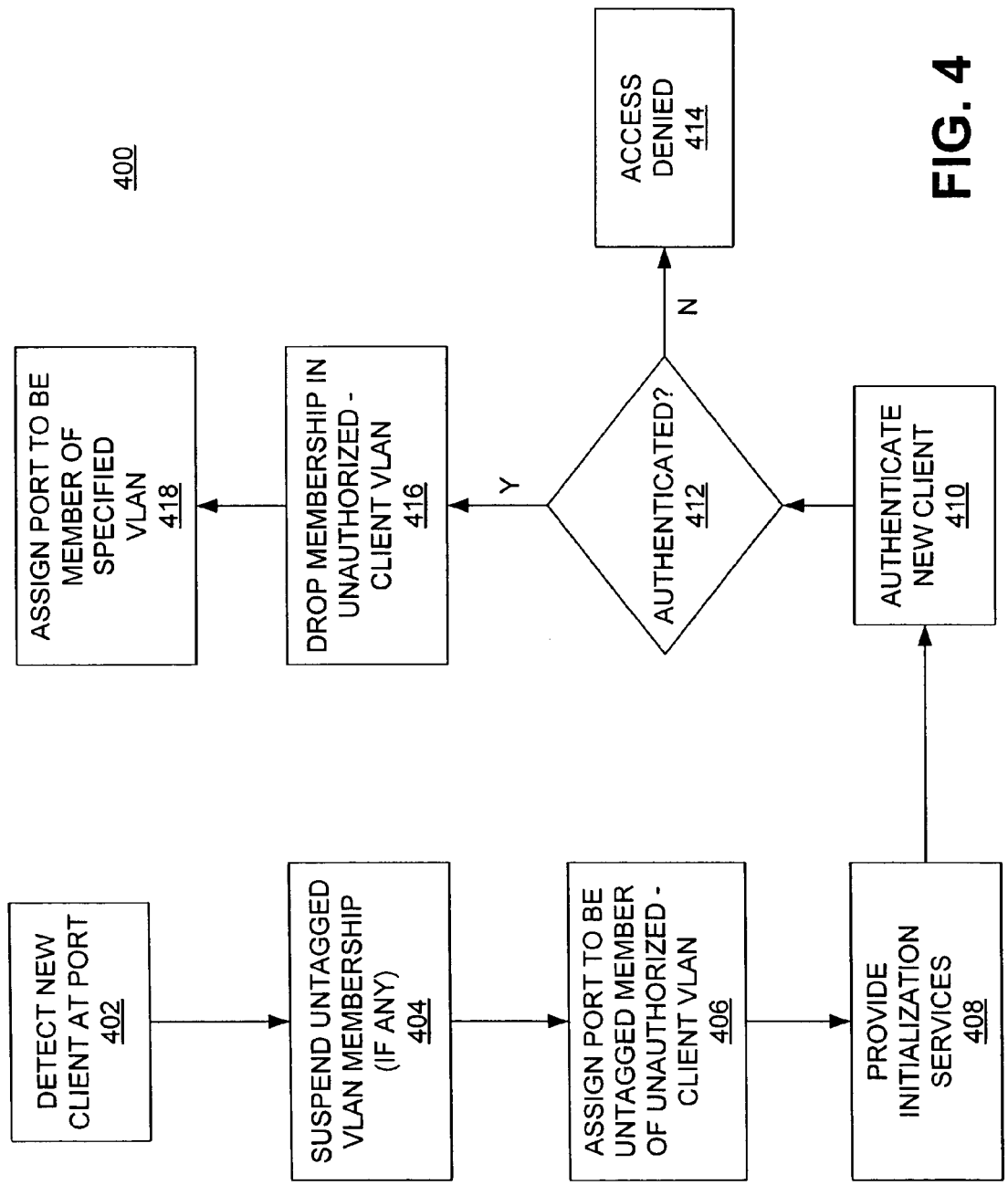

METHOD AND APPARATUS FOR ACCESS SECURITY SERVICES

BACKGROUND OF THE INVENTION

1. Field of the Invention

The present invention relates generally to networking. More particularly, the present invention pertains to access security for networks.

2. Description of the Background Art

Local area networks (LANs) of various types that are IEEE 802 compliant may be connected together with media access control (MAC) bridges. The IEEE 802.1Q standard defines the operation of virtual LANs (VLANs) within a bridged LAN infrastructure.

Under IEEE 802.1Q, VLANs are not restricted to a single switch. Such VLANs can span many switches (and may even span across a wide area network). A tag field with a VLAN identifier (VLAN ID or VID) is included with the data frame. The tag with VID serves to communicate the VLAN membership information between switches. Within IEEE 802.1Q, the VID can range from 1 to 4094.

A switch port which is IEEE 802.1Q compliant may be configured to transmit tagged frames to other IEEE 802.1Q-compliant devices (such as, for example, other IEEE 802.1Q-compliant switches), or it may be configured to transmit untagged frames to devices that are non-IEEE 802.1Q-compliant (such as, for example, typical network interface cards for printers or computers). A non-IEEE 802.1Q-compliant device that receives a tagged frame will not comprehend the VLAN tag and will typically drop the frame. Hence, a port should be configured to send untagged frames if non-IEEE 802.1Q-compliant devices are attached to the port.

FIG. 1 is a schematic diagram illustrating a conventional IEEE 802.1Q-compliant switch 100 with ports configured as members of various VLANs. The switch 100 includes a switching section 102, a plurality of switch ports 104, a switch operating system (OS) 106, and a switch configuration file 108.

The switching section 102 is coupled to each of the ports 104. The switching section may include, for example, a crossbar switch or other circuitry, and makes connections between the ports 104 so that frames can be transferred from one port to another port.

Eight switch ports 104 are shown in this example. The ports 104 are shown as numbered, for example, as #1, #2, #3, #4, #5, #6, #7, and #8. Under IEEE 802.1Q, each port may be assigned untagged membership in one VLAN. More specifically, there is an ingress list and an egress list of VLANs. The ingress list helps determine how to classify frames onto VLANs when they are received. The egress list determines the format (tagged or untagged) the frames will have when transmitted. It is possible to have many untagged VLANs on the egress list in untagged format, but typically in ingress, there is only a single untagged VLAN. In other words, as far as the ingress list is concerned, typically a port 104 may be an untagged member of only one VLAN, but it may be a tagged member of more than one VLAN. Even if a port 104 is not an untagged member of any VLAN, it may still be a tagged member of one or more VLANs and pass along frames with those VLAN tags.

The untagged membership of each port 104 in FIG. 1 is indicated by a Port VLAN ID or PVID. In the example illustrated in FIG. 1: port #1 has been configured with PVID 2; port #2 has been configured with PVID 1; port #3 has been configured with PVID 2; port #4 has been configured with PVID 3; port #5 has been configured with PVID 2; port #6 has been configured with PVID 1; port #7 has been configured with PVID 2; and port #8 has been configured with PVID 1. In other words, ports # 2, #6, and #8 are untagged members of the VLAN having VID 1. Ports #3, #5, and #7 are untagged members of the VLAN having VID 2. Port #4 is an untagged member of the VLAN having VID 3. Port #1 is not an untagged member of any VLAN.

In the example illustrated, port #1 is coupled to another switch that is 802.1Q compliant. As such, the other switch can receive and decode frames with VLAN tags. Such tagged frames may be sent via port #1 to the other switch. For example, port #1 may be a tagged member of the VLAN with VID 3. For example, if port #2 of the switch 100 received a broadcast data frame tagged with VID 3, that tagged data frame would then be transmitted via port #1 to the other switch. In addition, an untagged version of the data frame would be broadcast via port #4.

The switch OS 106 includes software routines used to control the operation of the switch 100. The switch configuration file 108 includes configuration information utilized by the switch OS 106. For example, the switch configuration file 108 may include the untagged and tagged VLAN membership data for each port 104 of the switch 100.

FIG. 2 is a flow chart depicting a conventional method 200 for responding to a new client at a port when the port is under the control of the IEEE 802.1X port access control scheme. For purposes of discussion, consider the new client to be accessing the network via switch port #7 of the switch 100 in FIG. 1. The new client is detected 202 by the port. For example, the new client may be a laptop computer of a university student, and the student may be trying to access a network in a teaching laboratory at the university. In this example, the laboratory network utilizes an implementation of the IEEE 802.1X protocol to authenticate student computers before allowing the computers access to the network.

IEEE 802.1X is an example of a network access server (NAS) protocol. IEEE 802.1X runs at layer 2 of the OSI networking model, and so IEEE 802.1X may be completed prior to a client obtaining an internet protocol (IP) address (which is a layer 3 type address). Under IEEE 802.1X, an authentication session may utilize, for example, the Radius protocol between an authentication server and supplicant software at the new client.

A branch in the process 200 occurs depending on whether or not 204 the new client has the resources present to enable an authentication session. For example, the branch would occur depending on whether or not the student's computer has IEEE 802.1X-compliant supplicant software.

Let's first consider the situation where the situation where the new client does have the resources to enable the authentication session (the Y or Yes branch from 204). For example, the student's computer has the IEEE 802.1X supplicant software already installed. In this situation, an authentication session occurs 208 with the new client in order to authenticate the new client. The authentication may involve, for example, checking the new client against a secure database of authorized users. If the new client does not pass authentication, then access by the new client to the network would be denied 206. If the new client passes the authentication, then access via the switch port 104 would be granted 212 to the new client. In our example, if access was via port #7 of FIG. 1, then the new client would be able to receive untagged frames on the VLAN with VID 2.

However, now consider the situation where the student's computer does no have IEEE 802.1X supplicant software currently on it. In other words, the new client does not yet have installed the resources needed to enable the authentication session (the N or No branch from 204). For instance, IEEE 802.1X software is included in Microsoft Windows XP, but not in prior versions of Windows. Hence, a laptop running one of the prior versions would not have the IEEE 802.1X supplicant installed as part of the operating system. In this situation, since the authentication session is not enabled, access is simply denied 206. This result is undesirable because the new client may be "friendly" (for example, it may be a properly registered student with an older Windows operating system on her laptop). In other words, if the new client had the proper resources, then authentication may have been completed. However, due to a lack of the resources, the authentication session was not enabled to be performed. In another example, the new client may have the supplicant software installed, but it may not yet have a valid account.

The above-described problems and disadvantages may be overcome by utilizing embodiments of the present invention.

SUMMARY

One embodiment of the invention pertains to a method for a switch to respond to a new client. A new client is detected at a port of the switch. The switch temporarily assigns the port to be an untagged member of a virtual local area network (VLAN) which is configured for unauthorized clients. Initialization services are provided to the new client via the unauthorized-client VLAN.

Another embodiment of the invention relates to an apparatus for switching network packets. The apparatus includes switching circuitry, and a plurality of ports coupled to the switching circuitry. At least one of the ports is configurable to an open VLAN mode. In the open VLAN mode, upon being contacted by a new client, the port is temporarily assigned to be an untagged member of a guest VLAN that is specifically configured for unauthorized clients.

Another embodiment of the invention relates to a method for filtering access to network resources. The method includes detecting a new client at an access port, and temporarily configuring a first filter at the access port. The first filter provides access to a first network with resources for unauthorized clients, and the new client is authenticated using the resources of the first network. If authentication is received for the new client to access a second network, then the first filter is replaced with a second filter at the access port. The second filter provides access to the second network.

BRIEF DESCRIPTION OF THE DRAWINGS

FIG. 4 is a flow chart depicting a method for responding to a new client at a port in an open VLAN mode in accordance with an embodiment of the present invention.

DETAILED DESCRIPTION

Figure 1:
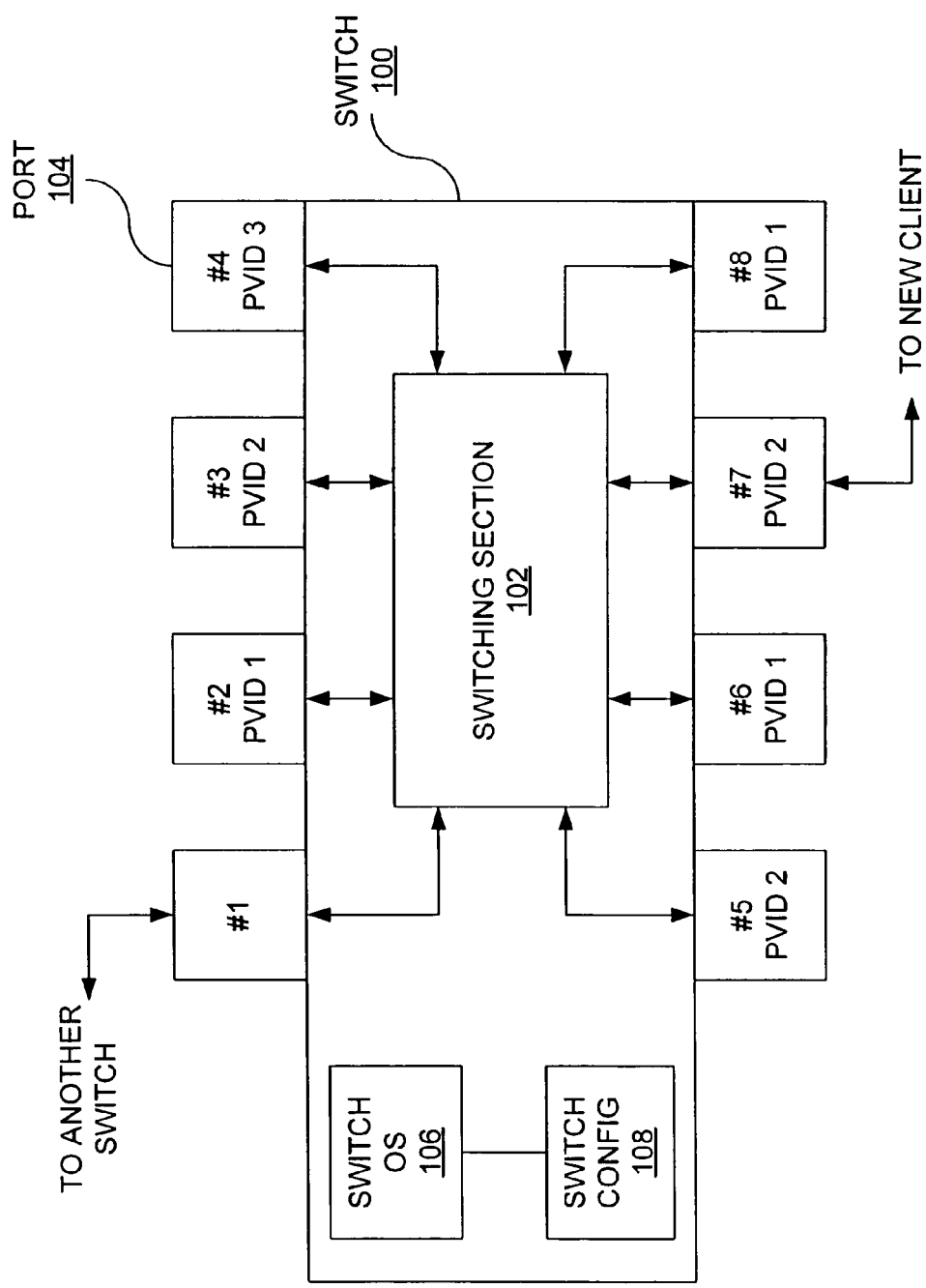
FIG. 1 is a schematic diagram illustrating a conventional IEEE 802.1Q-compliant switch with ports configured as members of various VLANs.
Figure 2:
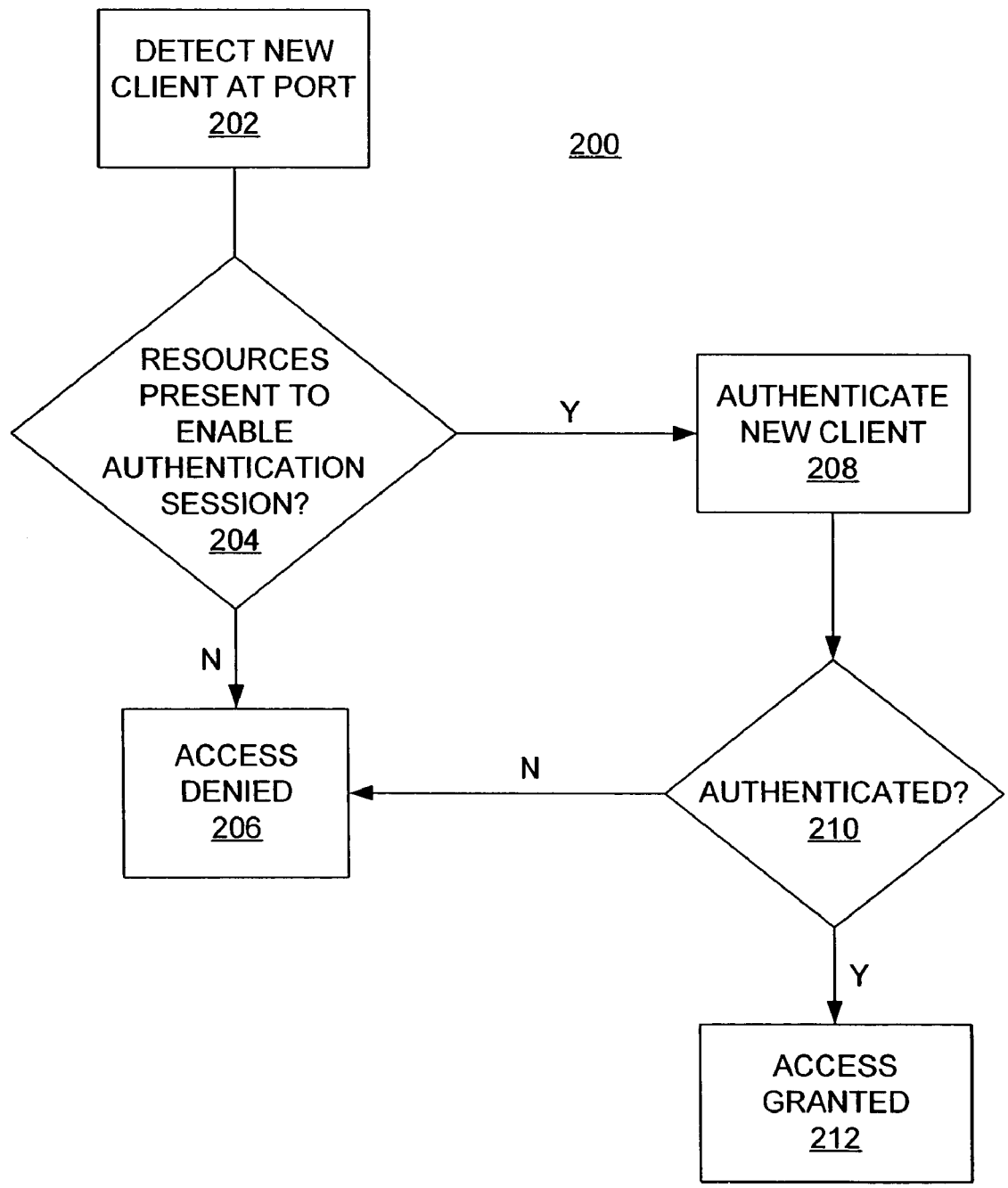
FIG. 2 is a flow chart depicting a conventional method for responding to a new client at a port when the port is under the control of the IEEE 802.1X port access control scheme.
Figure 3A:
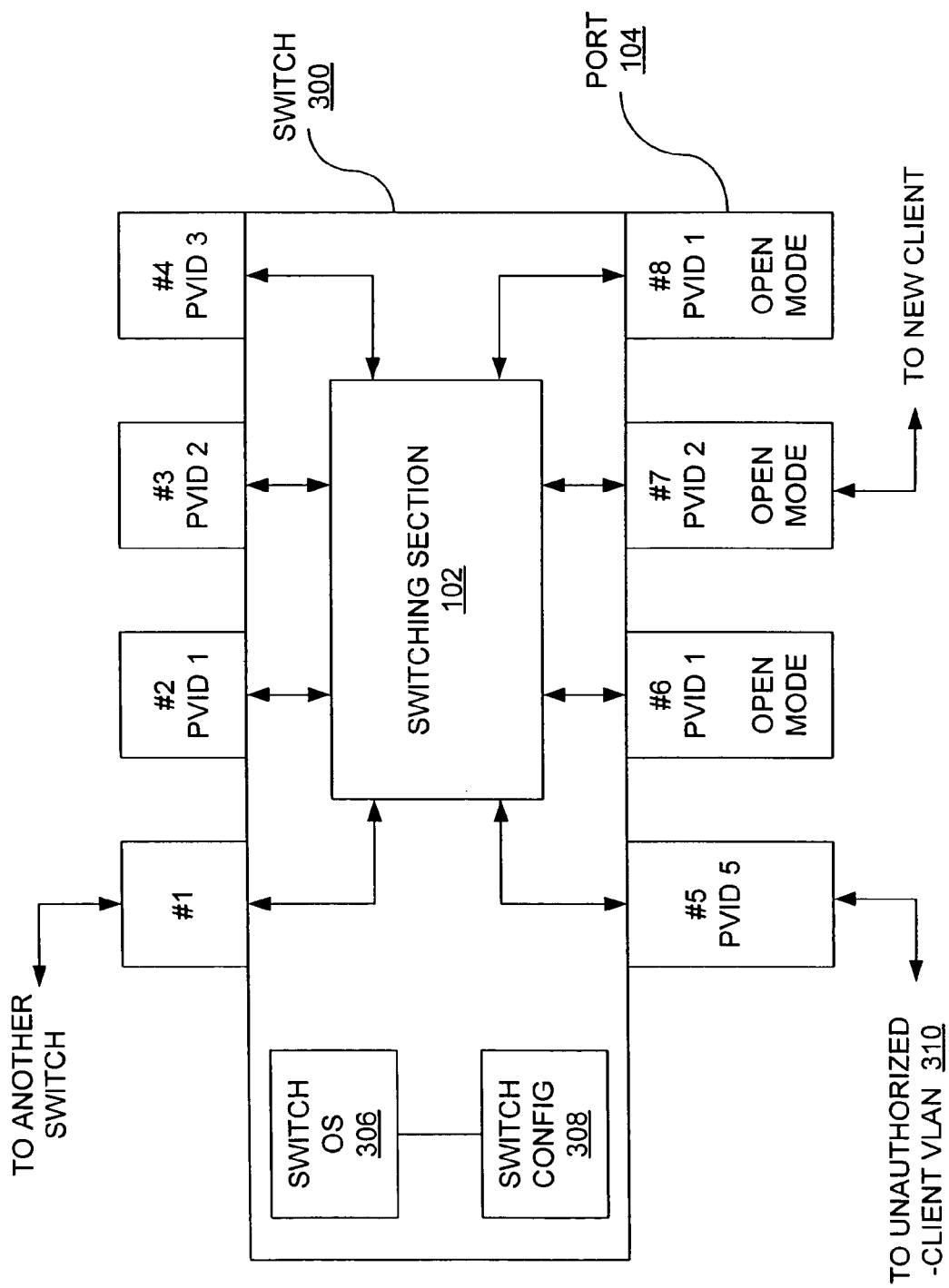
FIG. 3A is a schematic diagram illustrating a switch with ports configurable to an open VLAN mode in accordance with an embodiment of the present invention.

FIG. 3A is a schematic diagram illustrating a switch 300 with ports configurable to an open VLAN mode in accordance with an embodiment of the present invention. Similar to the switch 100 of FIG. 1, the switch 300 of FIG. 3A includes a switching section 102, a plurality of switch ports 104, a switch operating system (OS) 306, and a switch configuration file 308. However, the switch OS 306 is modified to enable one or more of the switch ports 104 to be configurable to the open VLAN mode. The switch configuration file 308 is also modified so as to include configuration data for the open VLAN mode. For example, the modified switch OS 306 may include an additional software module programmed to provide the open VLAN functionality, and the modified switch configuration file 308 may include additional data fields for the open VLAN mode configuration data. In the particular example depicted in FIG. 3A, the three (#6, #7, and #8) of the eight ports 104 are configured to be in the open VLAN mode, while the other five ports (#1 through #5) are not.

Another difference is that one of the switch ports 104 provides access to an unauthorized-client VLAN 310. In the particular example illustrated in FIG. 3A, the unauthorized-client VLAN corresponds to VID 5, and port #5 is configured with PVID 5 so as to be an untagged member of the VLAN with VID 5. In this example, frames with VID 5 would be broadcast to the unauthorized-client VLAN 310 via port #5. Note that the unauthorized-client VLAN 310 may be accessed via VLAN tagged frames in addition to, or instead of, the access by way of untagged frames. Access via tagged frames may occur if one or more of the ports 104 are tagged members of the unauthorized-client VLAN 310.

Figure 3B:
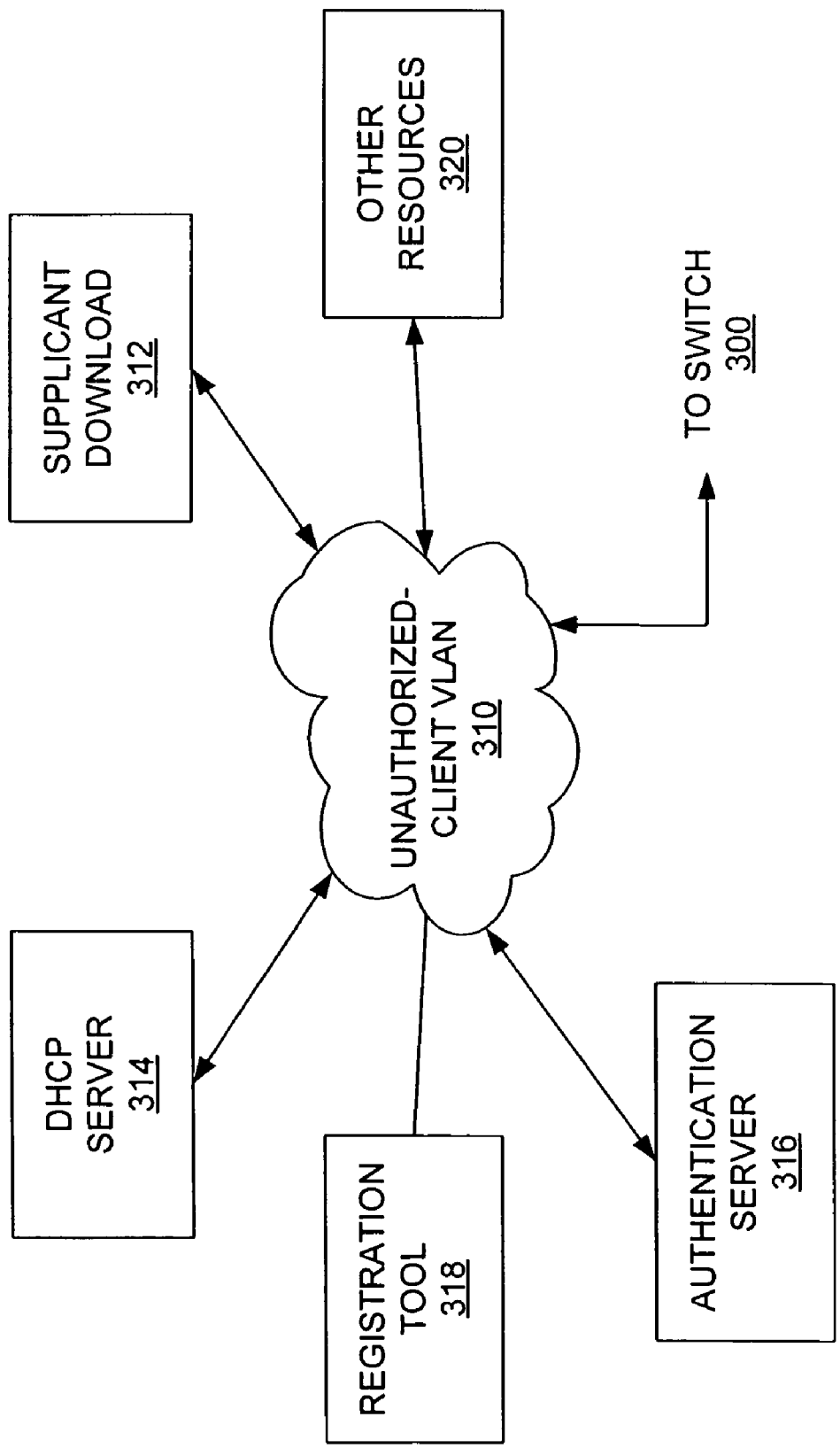
FIG. 3B is a schematic diagram illustrating an unauthorized-client VLAN in accordance with an embodiment of the present invention.

FIG. 3B is a schematic diagram illustrating an unauthorized-client VLAN 310 in accordance with an embodiment of the present invention. The unauthorized-client VLAN 310 is accessible by a new client through an open-VLAN-configured port. The use of the unauthorized-client VLAN 310 in regards to access security is further described below in relation to FIG. 4 in accordance with an embodiment of the invention.

In accordance with one embodiment, the unauthorized-client VLAN 310 includes supplicant download facility 312, dynamic host configuration protocol (DHCP) server 314, an authentication server 316, a registration tool 318, and perhaps other resources 320 providing initialization type services to facilitate the new client gaining access to the secure network. The supplicant download facility 312 enables a new client without the supplicant software to download and install the supplicant software. The DHCP server 314 provides and allocates an IP address to the new client device, if the new client device is not configured with a fixed (manual) IP address. The authentication server 316 may comprise, for example, a Radius authentication server or a similar type of server. The registration tool 318 may comprise, for example, a web-based software interface to set-up a valid account on the secure network. The other resources 320 may include, for example, software that interrogates the new client to determine various parameters (such as the OS version of the new client) and antivirus software for scanning the new client for viruses.

FIG. 4 is a flow chart depicting a method 400 for responding to a new client at a port in an "open" or "unauthorized" VLAN mode in accordance with an embodiment of the present invention. For purposes of discussion, consider the new client to be accessing the network via switch port #7 of the switch 300 in FIG. 3. The new client is detected 402 by the port. As in the previous example, port #7 may use an implementation of the IEEE 802.1X protocol to authenticate new clients before allowing access to the network. However, now port #7 is configured in an open or unauthorized VLAN mode in accordance with an embodiment of the present invention.

The switch 300 responds to the new client by temporarily suspending 404 the untagged VLAN membership, if any, of the access port. In our example, port #7's untagged membership in the VLAN with VID 2 would be suspended. Suspending the untagged VLAN membership of the port protects that VLAN from "unfriendly" new clients while allowing the system to provide limited access to "friendly" clients, as described further below.

The switch port being accessed is then assigned temporarily 406 to be an untagged member of a VLAN which is configured specifically for unauthorized clients. This VLAN is referred to as the unauthorized-client VLAN 310. In our example, port #7 would be temporarily assigned to be an untagged member of the VLAN with VID 5 (corresponding to the unauthorized-client VLAN 310). Advantageously, the unauthorized-client VLAN 310 provides initialization resources to allow a friendly new client to proceed, whereas in the conventional process 200 access was denied 206 without such resources.

Various initialization services may be provided 408 to the new client via the unauthorized-client VLAN 310. For example, if the new client does not have the necessary supplicant software for the authentication session, then the supplicant software may be downloaded from a download source 312 to the new client from the unauthorized-client VLAN 310. In the conventional process 200, lack of the appropriate supplicant at the new client would block the access process. Other necessary software may similarly be downloaded to the new client. As another example, if the new client does not have a manual IP address, then an IP address may be assigned to the new client by a DHCP server 314 on the unauthorized-client VLAN 310. As another example, a registration service may be provided by a registration tool 318 for a new user to become a member of a group of authorized users. Other initialization services that resources 320 on the unauthorized-client VLAN 310 may provide include, but are not limited to, probing the new client to determine its operating system, scanning the new client for computer viruses, and so on.

The new client is authenticated 410 by way of an authentication session. The authentication 410 may be accomplished by communications between an authentication server 316 on the unauthorized-client VLAN 310 and corresponding supplicant software at the new client. For example, the authentication server may comprise a Radius authentication server, and the authentication may be accomplished in accordance with IEEE 802.1X. Other authentication servers and schemes may be used instead, for example, Kerberos, Unix password, NT-Domain, Lightweight Directory Access Protocol (LDAP), and so on.

If the new client does not pass authentication, then access by the new client to the network would be denied 414. Denial may occur, for example, if the user is not an authorized user. If the new client passes the authentication, then the process 400 continues by dropping 416 the untagged membership of the access port 304 in the unauthorized-client VLAN 310. In our example, port #7's untagged membership in the VLAN with VID 5 would be dropped. Instead, the access port 304 would be assigned 418 to be an untagged member of a specified VLAN. One embodiment of a process 500 for determining the specified VLAN to be assigned is described below in relation to FIG. 5.

Figure 5:
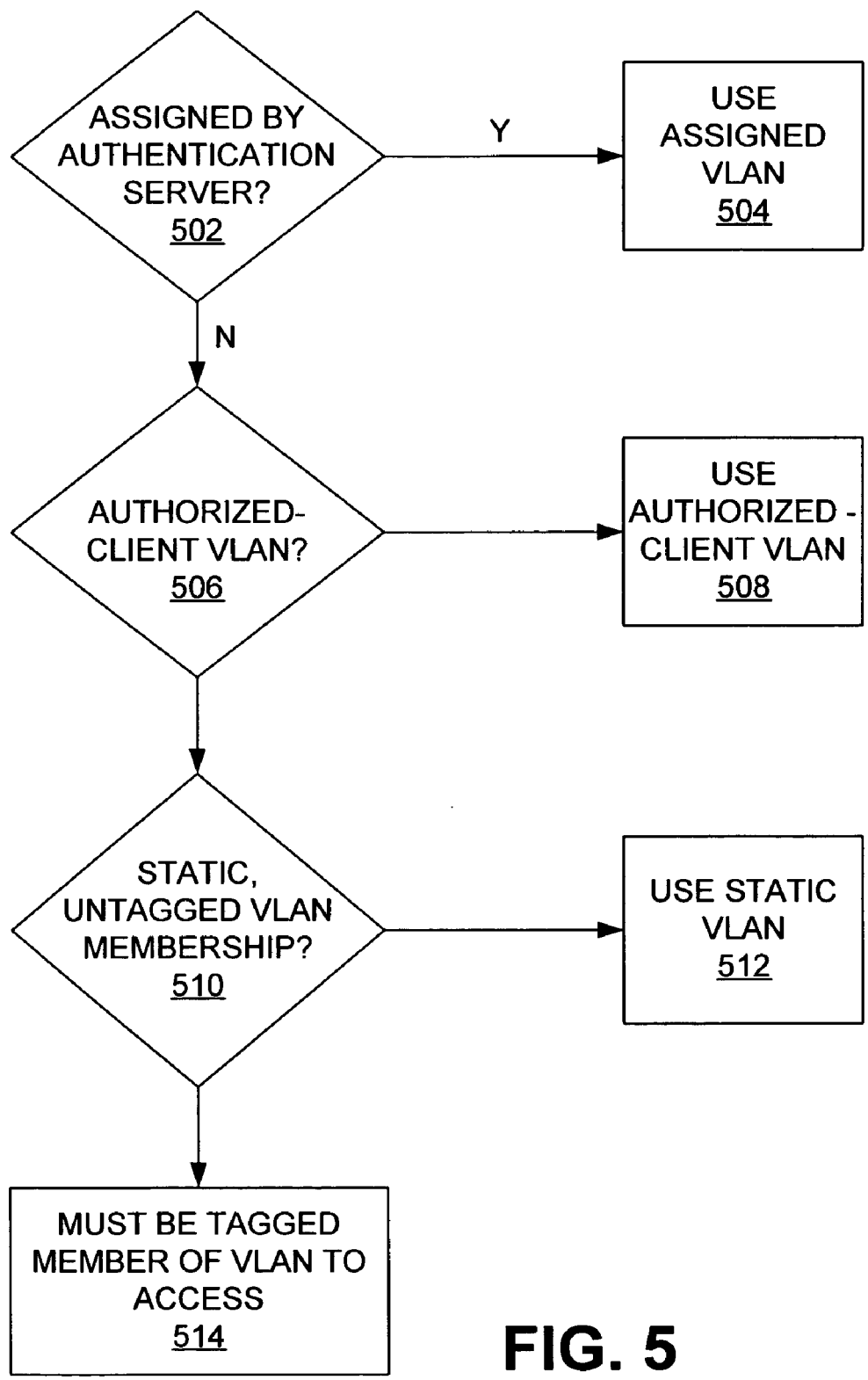
FIG. 5 is a flow chart depicting a method for the prioritized assignment of untagged VLAN membership in accordance with an embodiment of the present invention.

FIG. 5 is a flow chart depicting a method 500 for the prioritized assignment of untagged VLAN membership, after successful authentication, in accordance with an embodiment of the present invention. This is merely one implemented method 500 for the assignment, other alternate methods or prioritizations may be used.

A first priority may be an untagged VLAN membership assigned by the authentication server 316. Hence, a determination 502 is made as to whether such a membership has been specified by the authentication server 316. If there is one, then the port 304 is assigned 504 untagged membership in the VLAN specified by the authentication server 316.

A second priority may be an authorized-client VLAN membership specified in the port's configuration (separate and apart from the port's original PVID). Hence, a determination 506 is made as to whether such a membership has been specified in the port configuration. If one has been specified, then the port 304 is assigned 508 untagged membership in the authorized-client VLAN.

A third priority may be a static, untagged VLAN membership assigned to the port in its configuration. This is the port's original PVID, as shown in the previous figures. Hence, a determination 510 is made as to whether such a membership has been assigned. If one has been assigned, then the port 304 utilizes (reverts back to) the static, untagged VLAN membership.

An alternate way to view the method of the invention pertains to filtering access to network resources. For example, when a new client is detected at the port, the method of the invention temporarily configures a first filter to restrict access at the port to a first network. For example, under IEEE 802.1X, the first network may comprise an unauthorized VLAN, and the first filter may include the PVID of the unauthorized VLAN. If authentication is successful, then the method may continue by replacing the first filter with a second filter. The second filter provides access to a second (authorized) network. For example, the second filter may comprise the original PVID of the port, and the second network may comprise, for instance, the virtual network associated with that original PVID.

Embodiments of the invention are implementable in conjunction with network switching products. Such network switching products include, for example, HP ProCurve® switch products available from the Hewlett-Packard Company, with corporate offices in Palo Alto, Calif.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for a switch to respond to a new unauthenticated client, the method comprising:
   detecting the new unauthenticated client at a port of the switch;
   temporarily assigning the port to be an untagged member of a virtual local area network (VLAN) which is configured for unauthorized clients; providing initialization services to the new unauthenticated client via the unauthorized-client VLAN;
   authenticating the new client by way of an authentication session using the unauthorized-client VLAN;
   if the new client is authenticated then dropping the untagged membership of the port in the unauthorized-client VLAN and assigning the port to be an untagged member of a specified VLAN,
   wherein prioritization for assigning the specified VLAN membership comprises a first priority that is a VLAN membership which has been assigned to the port by an authentication server during the authentication session, a second priority that is membership in an authorized-client VLAN specified in the port's configuration, and a third priority that is a static untagged VLAN membership specified in the port's configuration.

2. The method of claim 1, wherein the authentication session involves communications between supplicant software at the new client and an authentication server.

3. The method of claim 1, wherein the initialization services include acquisition of supplicant software necessary for an authentication session.

4. The method of claim 1, wherein the initialization services include acquisition of internet protocol (IP) addressing by way of a dynamic host configuration protocol (DHCP) server on the unauthorized-client VLAN.

5. The method of claim 1, wherein the initialization services include user registration by way of a registration tool provided by the unauthorized-client VLAN.

6. The method of claim 1, wherein the initialization services include antivirus scanning of the new client.

7. The method of claim 1, wherein the initialization services include probing the new client.

8. The method of claim 1, wherein the specified VLAN membership comprises the static untagged VLAN membership specified in the port's configuration, and further comprising suspending the static untagged VLAN membership of the port prior to the assigning of the port to the unauthorized-client VLAN.

9. An apparatus for switching network packets, the apparatus comprising:
   switching circuitry;
   a plurality of ports coupled to the switching circuitry; and
   prioritization logic for assigning the specified VLAN membership,
   wherein at least one said port is configurable to an open virtual local area network (VLAN) mode,
   wherein in said mode, upon being contacted by a new unauthenticated client, the port is temporarily assigned to be an untagged member of a guest VLAN that is specifically configured for unauthorized clients,
   wherein in said mode once the new client is authenticated, the untagged membership of the port in the guest VLAN is dropped, and the port is assigned to be an untagged member of a specified VLAN, and
   wherein the prioritization logic assigns the specified VLAN membership in accordance with a first priority that is a VLAN membership which has been assigned to the port by an authentication server during the authentication session, a second priority that is membership in an authorized-client VLAN specified in the port's configuration, and a third priority that is a static, untagged VLAN membership specified in the port's configuration.

10. The apparatus of claim 9 wherein the specified VLAN membership comprises membership in the static untagged VLAN specified in the port's configuration, and wherein, in said open VLAN mode, the static untagged VLAN membership of the port is suspended prior to the assigning of the port to the guest VLAN.

* * * * *

UNITED STATES PATENT AND TRADEMARK OFFICE
CERTIFICATE OF CORRECTION

PATENT NO. : 7,370,346 B2
APPLICATION NO. : 10/425436
DATED : May 6, 2008
INVENTOR(S) : Paul T. Congdon Page 1 of 1

It is certified that error appears in the above-identified patent and that said Letters Patent is hereby corrected as shown below:

In column 2, line 66, delete "no" and insert -- not --, therefor.

In column 7, line 19, in Claim 1, after "authenticated" insert -- , --.

In column 8, line 23, in Claim 9, after "mode" insert -- , --.

In column 8, line 36, in Claim 10, after "claim 9" insert -- , --.

Signed and Sealed this

Fifth Day of August, 2008

JON W. DUDAS
*Director of the United States Patent and Trademark Office*